United States Patent [19]

Gelardi et al.

[11] E Patent Number: Re. 32,447

[45] Reissued Date of Patent: Jun. 30, 1987

[54] TAPE CASSETTE WITH SEPARATE TAPE GUIDE

[75] Inventors: Anthony L. Gelardi; John Gelardi, both of Cape Porpoise; Vincent Landry; Diane Pruneau, both of Saco, all of Me.

[73] Assignee: Shape Inc., Biddeford, Me.

[21] Appl. No.: 823,481

[22] Filed: Jan. 28, 1986

Related U.S. Patent Documents

Reissue of:

[64] Patent No.: 4,506,846
Issued: Mar. 26, 1985
Appl. No.: 568,638
Filed: Jan. 6, 1984

[51] Int. Cl.[4] ..... G11B 15/32; G11B 15/62; G11B 23/08

[52] U.S. Cl. ..... 242/199; 360/130.33

[58] Field of Search ..... 242/197–200, 242/76, 55.19 A; 360/132, 130.3, 130.32, 130.33; 226/196

[56] References Cited

U.S. PATENT DOCUMENTS

| | | | |
|---|---|---|---|
| 3,235,264 | 2/1966 | Mikrut | 242/200 |
| 3,348,786 | 10/1967 | Miller et al. | 242/200 |
| 3,394,899 | 7/1968 | Schoenmakers | 242/198 |
| 3,432,111 | 3/1969 | Ryder | 242/199 |
| 3,495,787 | 2/1970 | Wallace | 242/199 |
| 3,642,228 | 2/1972 | Tollkuhn | 242/199 |
| 3,706,426 | 12/1972 | Prahl | 242/198 |
| 3,796,394 | 3/1974 | Souza | 242/199 |
| 3,910,692 | 10/1975 | Scibilia | 352/130 |
| 3,934,842 | 1/1976 | Posso | 242/199 |
| 4,006,493 | 2/1977 | Gerry | 360/132 |
| 4,131,243 | 12/1978 | Machida | 242/199 |
| 4,166,593 | 9/1979 | Milants | 242/199 |
| 4,191,345 | 3/1980 | Sato et al. | 242/197 |
| 4,191,984 | 3/1980 | Tsukidate et al. | 360/132 |
| 4,267,986 | 5/1981 | Umera et al. | 242/199 |
| 4,337,493 | 6/1982 | Kagano | 360/130.33 |
| 4,545,500 | 10/1985 | Yamaguchi et al. | 220/4 B |

FOREIGN PATENT DOCUMENTS

| | | |
|---|---|---|
| 2526484 | 1/1976 | Fed. Rep. of Germany . |
| 2633672 | 2/1978 | Fed. Rep. of Germany . |
| 3111304 | 1/1982 | Fed. Rep. of Germany . |
| 2532098 | 2/1984 | France . |
| 2009993 | 6/1979 | United Kingdom . |

OTHER PUBLICATIONS

Japanese Publication 54–13668 Laid Open date Apr. 13, 1979.

Japanese Publication 55–50354 Laid Open Jan. 8, 1980.

Audio, vol. 63, No. 9, p. 17, Sep. 1979.

High Fidelity, vol. 31, No. 4, p. 39, Apr. 1981.

International Electrotechnical Commission, IEC Recommendation, publication 94A, First edition, p. 19 (1972).

*Primary Examiner*—John M. Jillions

*Attorney, Agent, or Firm*—Staas & Halsey

[57] ABSTRACT

A tape cassette for use with an external tape player/-recorder apparatus having upper and lower cassette halves and an independent tape guide for insertion between the cassette halves. The independent tape guide is a subassembly comprising an elongated bridge molded of plastic and having a top planar surface, a bottom planar surface, a front, a back, a left end and a right end, two pairs of corner posts located substantially centrally of the front and a plurality of lateral projections extending from the front in relatively perpendicular relation to the planes of the top and bottom of the bridge. Each pair of corner posts has holes formed therein to receive a stainless steel pin therethrough also in perpendicular relation to the planes of the top and bottom of the bridge, which together with the plurality of lateral projections define the tape sliding surface. In addition, there is provided behind the stainless steel pins a flexible leaf spring having a relatively soft facing member thereon for exerting an even pressure on the running tape as it crosses the magnetic head of the external tape player/recorder apparatus.

35 Claims, 5 Drawing Figures

TAPE CASSETTE WITH SEPARATE TAPE GUIDE

Matter enclosed in heavy brackets [ ] appears in the original patent but forms no part of this reissue specification; matter printed in italics indicates the additions made by reissue.

BACKGROUND OF THE INVENTION

This invention relates to a tape cassette, and more particularly, to a tape cassette having a separate guide for guiding tape along the open front of the tape cassette, opposite the magnetic head of an external tape player/recorder apparatus.

A tape cassette is usually made by joining substantially planar top and bottom halves together to house two tape reels and tape which runs therebetween. A tape cassette also includes a tape guide structure which is either formed integrally of the two halves along an open front wall region thereof or is molded independently and is positioned at the front wall region during assembly. In operation, a magnetic head of an external tape player/recorder apparatus is inserted into the open front wall region to contact the tape running across the tape guide.

To ensure optimum sound reproduction, it is critical that the tape crossing the magnetic head be oriented exactly "perpendicular" to the planes of the cassette halves to ensure proper contact between running tape and the magnetic head. Deviation from exact "perpendicularity" usually is the result of misalignment of the tape at the tape guide.

In order to avoid misalignment of the tape, the tape guide must be designed and manufactured according to strict structural parameters to ensure guiding of the tape in as "perpendicular" an orientation as possible. Of course, such careful design and manufacturing is expensive. On the other hand, because of the vast quantities of compact cassettes made and sold, economy of construction is also important and must be balanced against the strict structural parameters required for an effective tape guide.

Up until now, this balance has been attempted by molding the tape guide entirely of plastic, whether the tape guide is formed integrally of the top and bottom halves of the tape cassette or molded independently thereof.

For example, U.S. Pat. No. 3,934,842, issued to Posso, teaches a tape cassette comprising top and bottom halves of a tape cassette and an independent one-piece tape guide molded entirely of plastic. More particularly, the independent tape guide is made up of an elongated molded body, integral at its back with two longitudinal ribs having a notch therebetween for receiving a pin extending from the bottom half of the cassette which holds the tape guide in the longitudinal direction. There is also formed on the front a plurality of transverse tabs, a left pair of which cooperates with lugs located on the bottom half of the cassette to hold the tape guide in the transverse direction. There is also an aperture formed in the lower half of the cassette which combines with a member extending from the external tape player/-recorder to position the tape cassette relative to the tape player/recorder.

Each of the plurality of tabs is designed to require a central notch whose edge is rounded. This series of round-edged notches in the plastic molded tabs is co-planar and defines the tape sliding surface along the open front wall region of the tape cassette.

Finally, the tape guide of the '842 patent comprises a pressing member having a rigid support plate positioned centrally thereof for urging the tape against the magnetic head during operation. To this end, the most centrally located pair of tabs have projections formed integrally thereon in the shape of inclined ramps and adjacent bosses are formed integrally of the body of the tape guide. The rigid support plate of the pressing member is pressed against the ramps such that the plate deforms with its ends being housed between the projections and bosses.

The '842 patent states that the above-discussed tape guide design provides an absolutely perpendicular sliding surface for the tape to travel along. This design, however, actually has several inherent drawbacks which frustrate the realization of the "balance" between optimum "perpendicularity" and cost efficiency.

Firstly, the "perpendicularity" of the tape sliding surface is only as good as the molding process used to form the tape guide, most particularly, the tabs and the notches in the tabs. As suggested in the '842 patent, molding plastics to exacting structural specifications can be very difficult and expensive, and the more exacting the specifications of the molded product, the greater the chance for mold imperfections, especially where cost of manufacturing is a preoccupation.

Secondly, since the independent tape guide is designed to be positioned stationary relative to the cassette, if the area of the tape player/recorder intended for receiving the cassette is not perfectly co-planar relative to the top and bottom of the tape guide, or vice versa, the tabs and notches formed on the tape guide will not be properly oriented relative to the magnetic head. Thus, "perpendicularity" of the tape at the magnetic head would again be negatively effected.

More particularly, as discussed in the later U.S. Pat. No. 4,166,593, issued to Milants (which generally teaches away from the use of an independent tape guide), in a conventional two-part cassette housing having the tape guide molded integrally of each half of the tape cassette, guides project from the bottom cassette half and the top cassette half. When molding either such housing half, it is necessary to provide a taper of "draft" in those parts which extend substantially in the direction in which the mold is opened, so that the housing can be removed easily from the mold. Because of this draft the tape guide molded thereby does not possess true cylindrical surfaces about axes perpendicular to the planes of the cassette halves, but have more of a conical shape. A deterioration of tape playing/recording quality is inevitable with this construction.

In contrast to the conventional construction described above, the tape guide of the '842 patent teaches that the independent tape guide is molded with the mold interface perpendicular to the bottom cassette half wall so that the tape sliding surface can be "theoretically" perpendicular to the support planes. This independent tape guide unit is then fixedly mounted in a corresponding box-shaped recess in the cassette.

However, as emphasized in the '593 patent, the overall accuracy of the tabs and notches comprising the tape sliding surface depends greatly on the cumulative dimensional tolerances of the box-shaped recess and the tape guide in its entirety, and also on the tolerances observed during assembly. Moreover, the top and the bottom of the independent tape guide, like the conventional two-piece cassette described above, each are tapered to provide "draft", so that these surfaces by which the independent tape guide is mounted in the tape cassette may again provide an unwanted oblique relationship between the tape guide and the bottom of the box-shaped recess.

Thirdly, due to the relative rigidity of the pressing member used with the independent tape guide of the '842 patent, it is possible that the pressing member could exert an uneven or non-"perpendicular" pressure upon the tape. In addition, the interference fit between the pressing member and the projections and bosses formed on the tape guide may result in a distortion of the front radius of the tape guide. These factors again could frustrate "perpendicularity".

A fourth and final drawback of the tape guide of the '842 patent is that it requires molding parts on the bottom half of the cassette which are different than parts molded on the top half of the cassette and thus, this design prevents use of identical top and bottom halves which, of course, increases manufacturing costs.

From the foregoing, it can be seen that an improved tape guide for a tape cassette is desired which can be accurately formed, but which is relatively simple in structure such that it may be made easily through automation, and which effectuates optimum orientation of the tape in the tape cassette crossing the magnetic head of a tape player/recorder.

SUMMARY OF THE INVENTION

Accordingly, it is an object of the present invention to provide an economical, high quality tape cassette which is still molded substantially of relatively inexpensive plastic.

It is another object of the present invention to provide a tape cassette which can be formed and assembled efficiently by automation.

It is another object of the present invention to provide a tape guide for a tape cassette which accurately guides tape across the magnetic head of a tape player/-recorder.

It is another object of this invention to provide a tape guide for a tape cassette which can be manufactured at a relatively low cost and yet provides superior orientation of the tape relative to the tape player/recorder in comparison to the prior art.

It is another object of the present invention to provide a tape guide for a tape cassette having a tape guide sliding surface whose structural accuracy is not restricted by the current state of the molding art.

It is another object of the present invention to provide a tape guide for a tape cassette which replaces the traditional molded tabs located closest to the magnetic head with a separate pair of pins inserted into the tape guide.

It is another object of the present invention to provide a tape guide for a tape cassette whose most critical tape sliding surface, i.e., the area closest to the magnetic head, is defined by stainless steel pins whose design parameters can be carefully fabricated thus allowing for less exacting and less expensive design parameters at other areas of the tape guide, and most importantly, at the tape sliding surface.

It is another object of the present invention to provide a tape guide for a tape cassette which is an independent sub-assembly having a tape sliding surface defined by a pair of stainless steel pins and a plurality of projections formed on the tape guide, each pin and projection being positioned perpendicular relative to the planes of the top and bottom of the tape guide.

It is another object of the present invention to provide an independent tape guide for a tape cassette having locating holes formed therein for receiving a member of an external tape player/recorder to properly orient the tape guide relative to the external tape player/recorder.

It is another object of the present invention to provide a tape cassette having top and bottom halves and washers or liners made of clear plastic, while the tape guide, tape reels and tape rollers are made of dark plastic, thus imparting an attractive appearance to the tape cassette and allowing a view of the tape's operation.

It is finally an object of the present invention to provide a tape guide for a tape cassette having a flexible tape contacting member for urging an even "perpendicular" pressure against the tape crossing the magnetic head of the tape player/recorder.

Additional objects and advantages of the invention will be set forth in part in the description which follows, and, in part will be obvious from the description, or may be learned by practice of the invention. The objects and advantages of the invention may be realized and obtained by means of the instrumentalities and combinations particularly pointed out in the appended claims.

To attain the objects described above according to the present invention, a preferred embodiment of the invention comprises a tape cassette having top and bottom cassette halves and an independent tape guide inserted therebetween. The independent tape guide is a sub-assembly comprising an elongated bridge molded of plastic and having a top planar surface, a bottom planar surface, a front, a back, a left end and a right end, two pair of colinear corner posts located laterally of the front center of the bridge and a plurality of lateral projections extending from the front between each pair of colinear posts and the left and right ends respectively, in relatively perpendicular relation to the planes of the top and bottom of the bridge. Each pair of corner posts has holes formed therein to receive a stainless steel pin therethrough also perpendicular to the planes of the top and bottom of the bridge. The pins, together with the plurality of lateral projections, define the tape sliding surface of the tape guide of the present invention. There is also provided pairs of primary and secondary locating holes formed diagonally opposite at the top and bottom of the bridge. These holes are surrounded by collars. The collars aid in orienting the tape guide relative to the tape cassette, while the primary and secondary locating holes combine with a member(s) extending from the external tape player/recorder to orient the tape guide relative to the external tape player/recorder. Finally, there is provided behind the stainless steel pins a flexible leaf spring having a relatively perpendicular soft tape contacting member thereon for exerting an even pressure on the running tape.

This separate tape guide design, in comparison with the prior art designs discussed above, provides more accurate and cost efficient manufacturing and assembly of a tape cassette while providing optimum "perpendicularity" to attain improved sound reproduction.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

For convenience of reference to the tape cassette shown in the accompanying drawings, "front" indicates the area of the tape cassette exposed to the magnetic head of the player/recorder, "back" is the area opposite the front, "top" is the planar surface of the cassette facing up when the front of the cassette is inserted into the player/recorder, "bottom" is the opposite planar surface parallel the top, and "sides" are the areas extending perpendicularly between and connecting the edges of the top and bottom.

Figure 2:
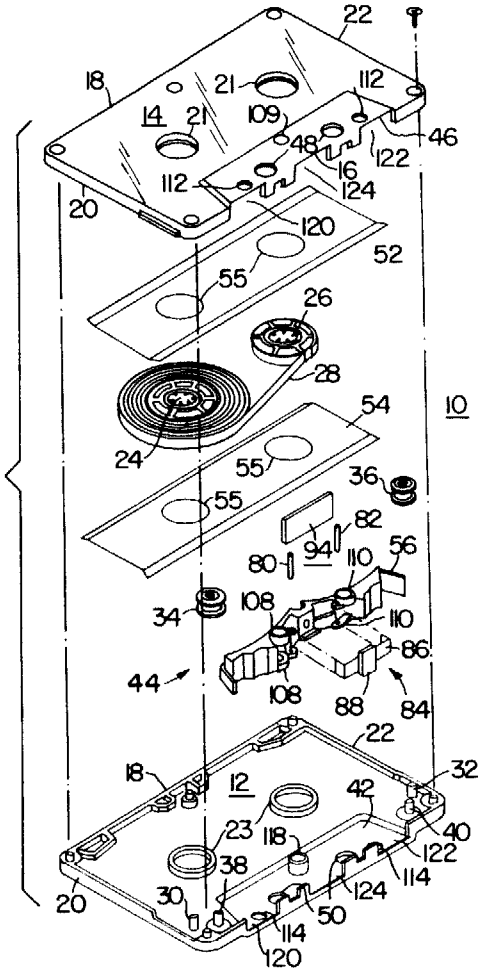
FIG. 2 is an exploded isometric view of the preferred embodiment of the tape cassette of the present invention, illustrating particularly assembly of the separate tape guide within the tape cassette.
Figure 1:
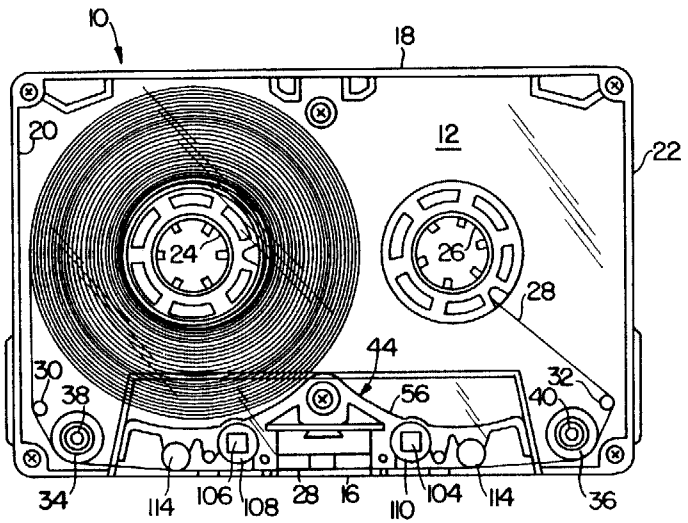
FIG. 1 is a top plan view of the preferred embodiment of the tape cassette of the present invention, illustrating particularly the lower half of the tape cassette with the separate tape guide positioned therein.
Figure 3:
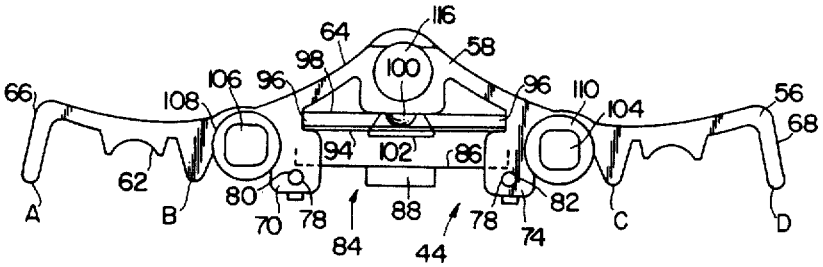
FIG. 3 is a top plan view of the preferred embodiment of the tape guide of the present invention.

FIGS. 1 and 2 illustrate the tape cassette according to the present invention, indicated generally by reference numeral 10. The tape cassette 10 includes a bottom half 12 and a top half 14 which are preferably made of a clear, hard plastic such as styrene. When assembled, the tape cassette 10 (and accordingly each cassette half 12 and 14) has a front 16, a back 18, a left side 20 (viewing from the tape/recorder . . . not shown), and a right side 22. Positioned within the tape cassette 10 are a first tape reel 24 and a second tape reel 26 used to assist in moving tape 28 throughout the tape cassette 10. Each tape reel 24 and 26 is made of a dark-colored plastic such as acetal.

Located on the bottom half 12 of the tape cassette 10 are corner tape guiding shafts 30 and 32. There are also provided tape rollers 34 and 36, which are preferably made of a dark- or black-colored, hard plastic such as acetal, and which are rotatably received by columns 38 and 40.

Elevated areas 42 and 46 are formed in the bottom half 12 and the top half 16 of the tape cassette 10, respectively, for receiving the tape guide sub-assembly 44 which will be described hereafter.

Both the top half 14 and the bottom half 12 have pairs of holes 48 and 50, respectively, for receiving part of the self-contained, separate tape guide 44, which will also be described hereafter.

As seen in FIG. 2, to assemble the tape cassette 10, the tape guide sub-assembly 44 is positioned within areas 42 and 46 as the bottom half 12 and the top half 14 are joined. The tape reels 24 and 26 with tape 28 extending therebetween are positioned between flat washers or liners 52 and 54, which are preferably flat or creased and made of a clear, flexible plastic such as an anti-static-treated polyester film. Each of the washers 52 and 54 are substantially thin and rectangular and have holes 55 formed therein for receiving the hubs of tape reels 24 and 26. The combination of reels 24 and 26 and washers 52 and 54 are located by pairs of raised annular rings, 21 and 23 formed in the top half 14 and bottom half 12, respectively, and positioned between the relatively central planar areas of the top and bottom halves, 12 and 14, respectively, of the tape cassette 10. The tape, of course, is placed across the front of the tape guide 44, and around tape guiding shafts 30 and 32 and rollers 34 and 36.

More particularly, as seen in FIGS. 2–5, the tape guide sub-assembly 44 comprises an elongated bridge 56 having a top 58, a bottom 60, a front 62, a back 64, a left end 66 and a right end 68. The elongated bridge 56 is preferably made of a single-piece of dark- or black-colored, hard molded plastic such as "ABS" (acrylonitrile butadiene styrene).

At the front 62 of the tape guide 44, there is located near the center thereof two pairs of colinear corner posts, 70, 72, and 74, 76. More particularly, there is an upper left corner post 70, a lower left corner post 72, an upper right corner post 74 and a lower right corner post 76. Each pair of posts 70, 72 and 74, 76 has a hole 78 extending therethrough for receiving the ends of a left pin 80 and a right pin 82, both of which are preferably cylindrical, of even length and made of non-magnetic stainless steel. The pins 80 and 82 are positioned within the holes 78 such that the pins 80 and 82 are perpendicular to the planes of the top 58 and bottom 60 of the tape guide 44 (and accordingly, parallel to each other).

In contrast to the tabs formed in the tape guide described in U.S. Pat. No. 3,934,842, the pins 80 and 82 may be formed more exactly and may be more easily oriented perpendicular to the planes of the top 58 and 68 of the tape guide 44. Thus, the desired "perpendicularity" is no longer made dependent on the current state of the molding art to create the mold for forming the tape guide. In addition, the problems regarding "draft" in molding, as discussed in regard to the prior art, are eliminated by the use of these pins 80 and 82. In addition the dimensions or other quality characteristics of the stainless steel pins 80 and 82 may be more carefully controlled than the molded projections of the prior art. For example, a stainless steel pin may have a particular low friction or low wear surface finish or plating applied thereto which is superior in tape contacting characteristics to a molded plastic surface.

In addition, since the area near the magnetic head is the most critical for "perpendicularity" and thus overall performance, greater engineering and manufacturing effort and expense may be put into producing the pins, 80 and 82, while less engineering and manufacturing effort and expense may be put into producing the rest of the tape guide, and particularly the tape sliding surface of the tape guide.

Thus, the first drawback of the '842 patent is overcome by the present invention, i.e., the accuracy of the most critical area of the tape sliding surface is not dependent upon the present state of the molding art. Instead, metal pins are used to create exact "perpendicularity".

At the front 62 of the tape guide 44, there is formed from left to right projections or ribs denominated by the letters A, B, C and D. Each of the projections A–D are molded perpendicular to the planes of the top 58 and bottom 60 of the tape guide 44. The projections A–D, along with the stainless steel pins 80 and 82, define the tape sliding surface of the present invention.

The tooling used to produce the particular "perpendicularity" of the projections A–D in the present invention is different from that used with the '842 patent for producing "perpendicularity" of the tabs and notches therein. The tooling used herein is more similar to that described in U.S. Pat. No. 4,166,593. That is, the parting line (mold opening plane) of the mold used to produce the present invention is similar to the mold described in relation to FIG. 3 of the '593 patent. The mold used for the present invention has a parting line parallel to the tape traveling direction in the tape cassette 10 and the side action member in the mold forms the projections A–D perpendicular to this tape traveling direction. The "B" motion described in the '593 patent is similar to the movement of the side action member used to form the present invention to allow molding of a planar top 58 and bottom 60 and also the plurality of projections A–D perpendicular to the planes of the bridge top 58 and bottom 60 of the bridge 56.

Thus, the second drawback of the '842 patent is overcome by eliminating "draft" during the molding process.

The tape guide sub-assembly 44 also comprises a spring means 84 comprising a leaf spring 86 and a relatively soft, low friction tape contacting member 88. The ends of the leaf spring 86 are positioned on a left ridge 90 and a right ridge 92 formed between each pair of posts 70, 72 and 74, 76, respectively. Each of the ridges 90 and 92 are relatively flat and are also formed perpendicular to the planes of the top 58 and bottom 60 of the tape guide 44. By resting against these perpendicular ridges 90 and 92, the spring means 84 is capable of deflecting and exerting an even and perpendicular force uniformly against the tape 28 crossing the magnetic head during operation.

Thus, the third drawback of the '842 patent is overcome since when the spring means 84 is inserted in the present invention it is not irregularly distorted, nor is the tape guide 44 itself irregularly distorted. Thus, the spring means 84 retains its flexible nature and constantly provides an even "perpendicular" pressure against the tape during operation.

A relatively rigid shield 94 having a rectangular shape is also used with the tape guide 44 of the present invention. This shield 94 is a conventional means of keeping magnetic signals which are produced near the recording head away from the tape 28 on the reels 24 and 26. The shield 94 fits into areas 96 formed between the posts 70, 72, 74 and 76 and a wall 98. The wall 98 has one or more rounded projections 100 extending therefrom for abutting the shield 94. Finally, the shield 94 rests on a ledge 102 extending perpendicularly from the bottom of the wall 98.

Figure 4:
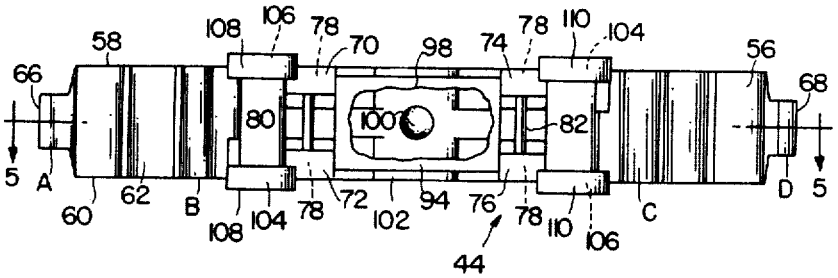
FIG. 4 is a front view of the preferred embodiment of the tape guide of the present invention.
Figure 5:
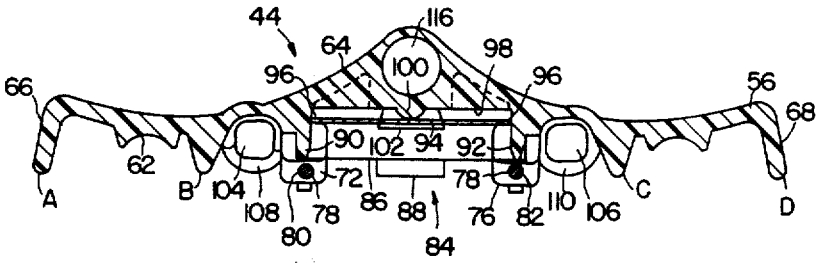
FIG. 5 is a top cross-sectional view of the preferred embodiment of the tape guide of the present invention.

As shown in FIG. 4, the tape guide 44 also contains a pair of bottom-to-top diagonally opposed primary locating holes 104 and a pair of top-to-bottom diagonally opposed secondary locating holes 106. The primary and secondary locating holes are rectangular in shape, with the secondary locating holes being slightly larger than the primary locating holes, e.g., preferably 0.156 inch side-to-side as opposed to 0.143 inch (the dimensions from front to back are preferably the same, i.e., 0.147 inch). This difference in dimensions is required to compensate or provide "slack" for the manufacturing tolerances of the external tape player/recorder or of the cassette itself.

The primary and secondary locating holes are molded into the tape guide 44 and are important because they define the relative positions of the projections A, B, C and D, as well as the steel pins 80 and 82, which are the tape sliding surface.

Positioned around each of the holes 104 and 106 on the left side of the bridge, are left collars 108 and positioned around each of the holes 104 and 106 on the right side of the bridge are right collars 110. When the tape cassette 10 is being assembled, left collars 108 are positioned within one set of holes 48 and 50 located in the top half 14 and the bottom half 12, respectively, of the tape cassette 10, and the right collars 110 are similarly positioned within the other set of holes 48 and 50 located in the top half 14 and bottom half 12 of the tape cassette 10.

Both the bottom half of the cassette 12 and the top half of the cassette 14 also have a pair of colinear clearance holes 112 and 114, respectively. These clearance holes 112 and 114 function to receive the drive pin (not shown) of the external player/recorder when the tape cassette 10 is inverted during operation to play/record both sides of the tape 28.

Thus, the collars 108, 110 orient the tape guide 44 relative to the tape cassette 10, while the primary and secondary locating holes 104, 106, respectively, combine with the pair of locating guide pins (not shown) of the external tape player/recorder (not shown) for properly orienting the tape guide 44 relative to the tape player/recorder. Immobilizing the tape guide 44 of the present invention within the tape cassette 10 during assembly thereof is not as crucial as is taught by the '842 patent. Instead, it is more important that the tape guide 44 be aligned relative to the external tape player/recorder than to the tape cassette 10. As a matter of fact, the '842 patent does not even have any separate holes in the independent tape guide for receiving the external tape player/recorder.

Thus, a major difference between the present invention and the '842 patent is that the present invention emphasizes the orientation of the tape guide relative to the magnetic head, whereas the '842 patent emphasizes the orientation of the tape guide relative to the cassette. The inherent drawback of this type of design was already discussed, supra.

The tape guide 44 also has a substantially cylindrical hole 116 near the central back 64 of the bridge 56 which, when the tape guide 44 is inserted into the tape cassette 10, surrounds a shaft 118 formed on the bottom half 12 of the tape cassette 10. The shaft 118 eventually is received by a hole 109 formed in the top half 14 of the tape cassette 10 during final assembly.

As is common in the art, FIGS. 1 and 2 illustrate that there is formed in the front 16 of both the bottom half 12 and the top half 14 of the tape cassette 10 a left aperture 120 and a right aperture 122 for receiving the player/recorder roller (not shown) to be used together with the drive pin, and a central aperture 124 for receiving the magnetic head of the tape player/recorder.

As seen in FIGS. 1 and 2, the structures of the top half 14 and bottom half 12 are substantially the same except for minor modifications, e.g., shaft 118 and hole 109, so a basic mold could be used to make either half and then the minor modifications could be made. By having substantially similar halves, overall production costs are minimized.

Thus, the present invention overcomes the fourth drawback of the '842 patent, i.e., requiring separately designed top and bottom halves which, of course, increases production cost.

As seen from the embodiments described above, this invention provides a relatively simple design wherein the tape sliding surface is more accurately formed than in the prior art, primary and secondary locating holes aid in orienting the tape guide relative to the tape player/recorder, exactly machined stainless steel pins are used to partially define the tape sliding surface instead of using only imprecisely molded tabs, and perpendicular ridges are used to resiliently support a spring which also urges an even "perpendicular" pressure upon the tape crossing the magnetic head. These above features of the present invention provide an efficiently manufactured tape cassette for producing improved orientation of the tape in relation to the magnetic head and thus, improved sound reproduction.

In addition, the tape cassette of the present invention may be fabricated from different colored plastics, i.e., the top and bottom halves of the cassette may be made of clear, styrene plastic, the washers or liners may be made of clear, anti-static-treated polyester film, the bridge may be made of "ABS" (acrylonitrile butadiene styrene) and the tape reels and rollers may be made of acetal. This contrasting color combination provides an aesthetically pleasing cassette from a marketing standpoint, while also allowing the manufacturer or user to view the interior of the cassette, and more particularly, the operation of the cassette, which, of course, is a functional advantage.

The above-described tape cassette has been shown to be of the type intended for use in analog and digital audio tape players and recorders. However, the invention can be similarly applied to tape cassettes for use in video or other playing and/or recording apparatus.

The foregoing is considered as illustrative only of the principles of the invention. Further, since numerous modifications and changes will readily occur to those skilled in the art, it is not desired to limit the invention to the exact construction and operation of the embodiments shown and described. Accordingly, all suitable modifications and variations falling within the scope of the appended claims and their equivalents are intended.

We claim:

1. A tape guide having a tape sliding surface for guiding tape through a tape cassette and along an external tape player/recorder apparatus, comprising:

(a) an elongated bridge having
  (i) a relatively planar top surface, a relatively planar bottom surface, a front, a back, a left end and a right end, wherein the planes of the top and bottom surfaces are substantially parallel to each other,
  (ii) pin receiving means formed approximately at the center of the front of the bridge, and
  (iii) a plurality of projections formed perpendicular relative to the planes of the top and bottom surfaces of the bridge on the left and right of the pin receiving means; and (b) a first columnar pin and a second columnar pin positioned within the pin receiving means perpendicular relative to the planes of the top and bottom surfaces of the bridge, wherein the plurality of projections and the first and second pins define the tape sliding surface for the tape being guided through the tape cassette.

2. The tape guide as recited in claim 1, wherein the pin receiving means comprises a first colinear pair of posts and a second colinear pair of posts, each post having a hole formed therein, wherein the first pin is received by the holes in the first pair of posts and the second pin is received by the holes in the second pair of posts.

3. The tape guide as recited in claim 2, wherein each imaginary line passing through each first and second colinear pair of posts, respectively, is perpendicular to the planes of the top and bottom surfaces of the bridge.

4. The tape guide as recited in claim 3, wherein the bridge further comprises a pair of primary locating holes and a pair of secondary locating holes capable of receiving a member of the external tape player/recorder apparatus to orient the tape guide relative to the tape player/recorder apparatus.

5. The tape guide recited in claim 4, wherein each of the primary locating holes is diagonally opposed and each of the secondary locating holes is diagonally opposed, relative to the front of the bridge.

6. The tape guide as recited in claim 5, wherein the bridge further comprises:

(a) a first relatively flat ridge formed between the first pair of posts in perpendicular relation to the planes of the top and bottom surfaces of the bridge;
(b) a second relatively flat ridge formed between the second pair of posts in perpendicular relation to the planes of the top and bottom surfaces of the bridge; and
(c) spring means extending between and abutting the first and second ridges for urging the tape being guided along the tape sliding surface against the external tape player/recorder apparatus.

7. The tape guide as recited in claim 6, wherein the spring means comprises a leaf spring having bent ends to extend over each first and second ridge and a relatively low friction tape contacting member located centrally thereof.

8. The tape guide as recited in claim 7, wherein the bridge is a single, molded piece.

9. A tape cassette for running tape between tape reels, along a tape sliding surface and past an external tape player/recorder apparatus, comprising:

(a) a cassette housing having
  (i) a top half, and
  (ii) a bottom half joined to the top half; and (b) a tape guide positioned between the top half and the bottom half of the cassette housing and having
  (i) an elongated bridge with a relatively planar top surface, a relatively planar bottom surface, a front, a back, a left end and a right end, wherein the planes of the top and bottom surfaces are substantially parallel to each other, pin receiving means formed approximately at the center of the front of the bridge, and a plurality of projections formed perpendicular relative to the top and bottom surfaces of the bridge on the left and right front of the pin receiving means, and
  (ii) a first columnar pin and a second columnar pin positioned within the pin receiving means perpendicular relative to the planes of the top and bottom surfaces of the bridge, wherein the plurality of projections and the first and second pins define the tape sliding surface for the tape being guided through the tape cassette.

10. The tape cassette as recited in claim 9, wherein the elongated bridge is molded of plastic independently of the top half and the bottom half of the cassette housing.

11. The tape cassette as recited in claim 10, wherein the pin receiving means comprises a first colinear pair of posts and a second colinear pair of posts, each post having a hole formed therein, and wherein the first pin is received by the holes in the first pair of posts and the second pin is received by the holes in the second pair of posts.

12. The tape cassette as recited in claim 11, wherein each imaginary line passing through each first and second colinear pair of posts, respectively, is perpendicular to the planes of the top and bottom surfaces of the bridge.

13. The tape cassette as recited in claim 12, wherein the bridge further comprises a pair of primary locating holes and a pair of secondary locating holes, capable of receiving a member of the external tape player/-recorder apparatus to orient the tape guide relative to the tape player/recorder apparatus.

14. The tape cassette as recited in claim 13, wherein the bridge further comprises a collar surrounding each primary and secondary locating hole, the top and bottom half of the tape cassette each comprises holes for receiving the collars individually, and wherein when the tape guide is assembled between the top and bottom of the cassette, the collars are received by the holes in the cassette halves to orient the tape guide relative to the tape cassette.

15. The tape cassette as recited in claim 14, wherein the pair of primary locating holes is diagonally opposed and the pair of secondary locating holes is diagonally opposed, relative to the front of the bridge.

16. The tape cassette as recited in claim 15, wherein the bridge further comprises:

(a) a first relatively flat ridge formed between the first pair of posts in perpendicular relation to the planes of the top and bottom surfaces of the bridge;

(b) a second relatively flat ridge formed between the second pair of posts in perpendicular relation to the planes of the top and bottom surfaces of the bridge; and (c) spring means extending between and abutting the first and second ridges for urging the tape being guided along the tape sliding surface against the external tape player/recorder apparatus.

17. The tape cassette as recited in claim 16, wherein the spring means comprises a leaf spring having bent ends to extend over each first and second ridge and a relatively low friction tape contacting member located centrally thereof.

18. The tape cassette as recited in claim 17, wherein the top half and bottom half of the cassette are substantially identical in structure.

19. The tape cassette as recited in claim 18, wherein the bridge is a single, molded piece.

20. The tape cassette of claim 19, further comprising:

(a) a first washer positioned between the tape reels and the top half of the cassette;

(b) a second washer positioned between the tape reels and the bottom half of the cassette;

(c) a first tape roller rotatably positioned on the bottom half of the tape cassette, adjacent the left end of the bridge; and (d) a second tape roller rotatably positioned on the bottom half of the cassette adjacent the right end of the bridge.

21. The tape cassette of claim 20, wherein the top and bottom half of the cassette and the first and second washers are formed of a clear substantially flat material, and the bridge, the tape reels and the first and second tape rollers are formed of a relatively darker material.

*22. A tape guide having a tape sliding surface for guiding tape through the front area of a tape cassette along the magnetic head of an external tape player/recorder apparatus, the external tape player/recorder apparatus having at least one locating guide pin, the tape cassette having a top half, a bottom half arranged relative to the top half to define a space therebetween and an independently formed, elongated tape guide positioned only at the front area of the tape cassette within part of the defined space and spaced from a front edge of the tape cassette, the tape guide having a substantially planar top surface, a substantially planar bottom surface, a front, a back, a left end and a right end, wherein the planes of the top and bottom surfaces are substantially parallel to each other, and a plurality of projections formed perpendicular relative to the planes of the top and bottom surfaces of the tape guide, the improvement comprising:*

*primary locating means and secondary locating means formed in the tape guide which are capable of receiving the at least one locating guide pin of the external tape player/recorder apparatus to orient independently the tape guide relative to the magnetic head of the tape player/recorder apparatus.*

*23. The tape guide as recited in claim 22, wherein the primary locating means is a pair of primary locating holes diagonally opposed relative to the front of the tape guide and the secondary locating means is a pair of secondary locating holes diagonally opposed relative to the front of the tape guide.*

*24. The tape guide as recited in claim 23, further comprising a collar surrounding each primary and secondary locating hole and extending beyond the respective planes of the top and bottom surfaces of the tape guide.*

*25. The tape guide as recited in claim 23, wherein the plurality of projections form the tape sliding surface and the primary and secondary locating holes formed integrally as part of the tape guide and the at least one locating guide pin define the positions of the plurality of projections relative to the magnetic head.*

*26. The tape guide as recited in claim 22, further comprising a substantially cylindrical positioning hole formed in the back, middle of the tape guide capable of receiving a positioning shaft formed to extend from the tape cassette top or bottom half.*

*27. The tape guide as recited in claim 26, wherein the back of the tape guide is bowed inwardly from the area of the substantially cylindrical hole to the left and right ends of the tape guide.*

*28. A tape cassette for running tape between tape reels at the front area of the tape cassette, along a tape sliding surface and past a magnetic head of an external tape player/recorder apparatus, the external tape player/-recorder apparatus having at least one locating guide pin, the tape cassette having a top half, a bottom half arranged relative to the top half to define a space therebetween and an independently formed, elongated tape guide positioned only at the front area of the tape cassette within part of the defined space and spaced from a front edge of the tape cassette, the tape guide between the top half and the bottom half of the cassette having a substantially planar top surface, a substantially planar bottom surface, a front, a back, a left end and a right end, wherein the planes of the top and bottom surfaces are substantially parallel to each other, and a plurality of projections formed perpendicular relative to the planes of the top and bottom surfaces of the tape guide, the improvement comprising:*

*primary locating means and secondary locating means formed in the tape guide which are capable of receiving the at least one locating guide pin of the external tape player/recorder apparatus to orient indepen-*

*dently the tape guide relative to the magnetic head of the tape player/recorder apparatus.*

*29. The tape cassette as recited in claim 28, wherein the primary locating means is a pair of primary locating holes diagonally opposed relative to the front of the tape guide and the secondary locating means is a pair of secondary locating holes diagonally opposed relative to the front of the tape guide.*

*30. The tape cassette as recited in claim 29, further comprising:*

*a collar surrounding each primary and secondary locating hole and extending beyond the respective planes of the top and bottom surfaces of the tape guide, and the top and bottom halves of the tape cassette each including holes for receiving the collars individually,*

*wherein, when the tape guide is assembled between the top and bottom halves of the cassette, the collars are received by the holes in the cassette halves.*

*31. The tape cassette as recited in claim 29, wherein the plurality of projections form the tape sliding surface and the primary and secondary locating holes formed integrally as part of the tape guide and the at least one locating guide pin define the positions of the plurality of projections relative to the magnetic head.*

*32. The tape cassette as recited in claim 28, further comprising a substantially cylindrical positioning hole formed at the back, middle of the tape guide capable of receiving a positioning shaft formed to extend from the tape cassette top or bottom half.*

*33. The tape cassette as recited in claim 32, wherein the back of the tape guide is bowed inwardly from the area of the substantially cylindrical positioning hole to the left and right ends of the tape guide.*

*34. A tape guide having a tape sliding surface for guiding tape through the front area of a tape cassette along the magnetic head of an external tape player/recorder apparatus, the external tape player/recorder apparatus having at least one locating guide pin, the tape cassette having a top half and a bottom half arranged relative to the top half to define a space therebetween, the tape guide comprising:*

*an independently formed, elongated tape guide member of a moldable material positioned only at the front area of the tape cassette within part of the defined space and spaced from a front edge of the cassette, the tape guide member having*

*(a) a substantially planar top surface and a substantially planar bottom surface, wherein the planes of the top and bottom surfaces are substantially parallel to each other,*

*(b) a front;*

*(c) a back;*

*(d) a left end and a right end;*

*(e) a plurality of projections formed perpendicular relative to the planes of the top and bottom surfaces of the tape guide, wherein the projections form the tape sliding surface;*

*(f) a pair of primary locating holes formed in the tape guide diagonally opposed relative to the front of the tape guide and a pair of secondary locating holes formed in the tape guide diagonally opposed relative to the front of the tape guide capable of receiving the at least one locating guide pin of the tape player/recorder to orient independently the tape guide and define the positions of the plurality of projections relative to the magnetic head of the tape player/recorder;*

*(g) a collar surrounding each primary and secondary locating hole and extending beyond the respective planes of the top and bottom surfaces of the tape guide;*

*(h) a substantially cylindrical positioning hole formed at the back, middle of the tape guide capable of receiving a positioning shaft formed extending from the tape cassette top or bottom half; and*

*(i) the back of the tape guide being bowed inwardly from the area of the substantially cylindrical positioning hole to the left and right ends of the tape guide.*

*35. A tape cassette for running tape between tape reels at the front area of the tape cassette, along a tape sliding surface and past a magnetic head of an external tape player/recorder apparatus, the external tape player/recorder apparatus having at least one locating guide pin, the tape cassette comprising:*

*(a) a top half;*

*(b) a bottom half arranged relative to the top half to define a space therebetween;*

*(c) a positioning shaft formed extending from the cassette bottom or top half; and*

*(d) an independently formed, elongated tape guide member of a moldable material positioned only at the front area of the tape cassette within part of the defined space and spaced from a front edge of the tape cassette, the tape guide member having*

*(i) a substantially planar top surface and a substantially planar bottom surface, wherein the planes of the top and bottom surfaces are substantially parallel to each other;*

*(ii) a front;*

*(iii) a back;*

*(iv) a left end and a right end;*

*(v) a plurality of projections formed at the front of the tape guide perpendicular relative to the top and bottom surfaces of the tape guide, wherein the projections form the tape sliding surface;*

*(vi) a pair of primary locating holes formed in the tape guide diagonally opposed relative to the front of the tape guide and a pair of secondary locating holes formed in the tape guide diagonally opposed relative to the front of the tape guide capable of receiving the at least one locating guide pin of the external tape player/recorder apparatus to orient independently the tape guide and define the positions of the plurality of projections relative to the magnetic head of the tape player/recorder;*

*(vii) a collar surrounding each primary and secondary locating hole and extending beyond the respective planes of the top and bottom surfaces of the tape guide;*

*(viii) holes formed in the tape cassette top and bottom halves for receiving the collars individually;*

*(ix) a substantially cylindrical positioning hole formed at the back, middle of the tape guide capable of receiving the positioning shaft formed extending from the tape cassette top or bottom half; and*

*(x) the back of the tape guide being bowed inwardly from the area of the substantially cylindrical positioning hole to the left and right ends of the tape guide.*

* * * * *

UNITED STATES PATENT AND TRADEMARK OFFICE

CERTIFICATE OF CORRECTION

PATENT NO. : Re. 32,447

DATED : Jun. 30, 1987

INVENTOR(S) : GELARDI et al.

It is certified that error appears in the above-identified patent and that said Letters Patent is hereby corrected as shown below:

ON THE TITLE PAGE:

[56] References Cited

Foreign Patent Documents

Please Add:

2379132 8/25/78 FRANCE

Signed and Sealed this

First Day of December, 1987

*Attest:*

DONALD J. QUIGG

*Attesting Officer*

*Commissioner of Patents and Trademarks*